United States Patent [19]
Di Renzo et al.

[11] Patent Number: 5,968,341
[45] Date of Patent: Oct. 19, 1999

[54] ACTIVATED SILICA ENRICHED MAZZITE, PRODUCTION METHOD AND APPLICATION THEREOF

[75] Inventors: Francesco Di Renzo, Residence les Cedres BC; Francois Fajula, Theyran; Fredj Fitoussi, Lyons; Philippe Schulz, Ste. Foix les Lyon, all of France

[73] Assignee: Elf Aquitaine, Paris, France

[21] Appl. No.: 09/000,262

[22] PCT Filed: Jun. 5, 1997

[86] PCT No.: PCT/FR97/00998

§ 371 Date: Jun. 8, 1998

§ 102(e) Date: Jun. 8, 1998

[87] PCT Pub. No.: WO97/46487

PCT Pub. Date: Dec. 11, 1997

[30] Foreign Application Priority Data

Jun. 6, 1996 [FR] France .................................. 96 07013

[51] Int. Cl.$^6$ .............................. C10G 47/04; C07C 4/06; C01B 39/34; B01J 29/70
[52] U.S. Cl. .................... 208/111.01; 208/120; 208/135; 585/481; 585/533; 585/651; 585/653; 585/739; 502/77; 502/79; 502/85; 423/702; 423/705; 423/714; 423/DIG. 26; 423/328.2
[58] Field of Search .............................. 208/111.01, 120, 208/135; 585/481, 533, 651, 653, 739; 502/77, 79, 85; 423/702, 705, 714, DIG. 26, 328.2

[56] References Cited

U.S. PATENT DOCUMENTS

| | | | |
|---|---|---|---|
| 4,241,036 | 12/1980 | Flanigen et al. | 423/328 |
| 4,724,067 | 2/1988 | Raatz et al. | 208/120 |
| 4,780,436 | 10/1988 | Raatz et al. | 502/66 |
| 4,891,200 | 1/1990 | Fajula et al. | 423/328 |
| 5,139,761 | 8/1992 | Nair et al. | 423/328 |
| 5,157,198 | 10/1992 | Raatz et al. | 585/739 |
| 5,165,906 | 11/1992 | Di Renzo et al. | 423/710 |
| 5,230,790 | 7/1993 | Nair et al. | 208/111 |
| 5,371,311 | 12/1994 | Nair et al. | 585/467 |
| 5,451,391 | 9/1995 | Di Renzo et al. | 423/702 |
| 5,773,678 | 6/1998 | Benazzi et al. | 585/470 |
| 5,789,641 | 8/1998 | Alario et al. | 585/475 |

FOREIGN PATENT DOCUMENTS

| | | |
|---|---|---|
| 0206871A1 | 12/1986 | European Pat. Off. . |
| 0273403A1 | 7/1988 | European Pat. Off. . |
| 0419 307 A1 | 3/1991 | European Pat. Off. . |
| 0601924 A1 | 6/1994 | European Pat. Off. . |
| 2175890 | 12/1986 | United Kingdom . |

*Primary Examiner*—Bekir L. Yildirim
*Attorney, Agent, or Firm*—Burgess, Ryan & Wayne

[57] ABSTRACT

The invention provides an activated silica enriched mazzite having a chemical formula in the anhydrous state, expressed in molar ratios of:

a $M_{2/n}O$; $Al_2O_3$; b $SiO_2$;

with a variation from 0 to 0.5, M being an alkaline cation of valency n and b being greater than 7, and which has an acid strength corresponding to an amount of heat measured by ammonia absorption microcalorimetry, greater than 190 KJ/mol, and a pore volume, measured by cyclohexane adsorption, greater than 0.09 ml/g. The activated mazzites are useful in the conversion of hydrocarbons, in particular, the isomerization of $C_4$ to $C_8$ paraffin, and as molecular sieves in processes for the separation of hydrocarbons.

14 Claims, No Drawings

ACTIVATED SILICA ENRICHED MAZZITE, PRODUCTION METHOD AND APPLICATION THEREOF

BACKGROUND OF THE INVENTION

1) Field of the Invention

The subject of the present invention is a silica-enriched activated mazzite obtained by a crystallization gel containing zeolite crystals. The present invention also relates to its process of preparation and to its application as reaction catalyst for the conversion of hydrocarbons, in particular by isomerization, or as molecular sieves.

2) Background Art

Obtained for the first time by a synthetic route in 1966 under the name of zeolite omega by Flanigen and Kellberg (U.S. Pat. No. 4,241,036), mazzite was identified in 1972 in basaltic rocks from Mont Semiol, near Montbrison, Loire, France. Its crystalline structure was resolved by Galli (Cryst. Structure Comm., 3, 339, 1974) and Rinaldi et al. (Acta Cryst., B31, 1603, 1974). From its structure, of hexagonal symmetry, it belongs to the category of highly acidic zeolites with broad pores and unidirectional porosity, which makes it particularly advantageous for applications in catalysis, in particular for the conversion of hydrocarbons.

The omega claimed by Flanigen (U.S. Pat. No. 4,241,036) is characterized by an X-ray spectrum common to all the types of mazzites prepared subsequently, such as ZSM-4, LZ 202 or MZ-34. However, these mazzites, although identical in structure, are distinguished from one another by their specific synthetic route and different physical characteristics, such as the Si/Al ratio, their specific surface and their porosity.

In order to obtain a mazzite, so-called crystallization gels, containing a trivalent aluminium source, a silicon source, at least one alkali metal or alkaline earth metal cation in the hydroxide form, water and optionally an organic structuring agent, can be formed. However, from these constituents, by varying the stoichiometry of the gel or the conditions of the subsequent hydrothermal treatment necessary for the crystallization, it is possible to obtain zeolites which are very different from mazzite, such as offretite (OFF) or zeolite L (LTL) (S. Ernst and J. Weitkamp, Catalysis Today, 19, 1994, 27–60).

In order to improve the physical characteristics of these mazzites, silica gels, colloidal silicas, precipitated silicas, silicates or hydrolyzable silicic esters have been introduced into the synthesis or crystallization gel, as silicon source, and aluminates, alumina hydroxides, alumina in the pure or commercial form or amorphous aluminosilicates have been introduced into the synthesis or crystallization gel as trivalent aluminium sources. These aluminium sources were subsequently replaced by natural or synthetic crystalline aluminosilicates, mainly natural clays. Such a substitution has made it possible to obtain homogeneous growth of the crystals, due to the slow and even dissolution of these aluminosilicates in the synthesis medium (Dwyer, U.S. Pat. No. 4,091,007; Fajula, U.S. Pat. No. 4,891,200).

Other methods have been developed for synthesizing a novel mazzite from seeds of mazzite or of another zeolite in the presence or in the absence of organic structuring agent containing alkylammonium ions (Cannan, U.S. Pat. No. 4,840,779, Di Renzo, FR 2,651,221 and FR 2,698,862).

Thus, by varying the crystallization temperature to between 90° C. and 150° C. and the content of sodium cations and of organic structuring agent, such as tetramethylammonium, choline or p-dioxane, in the crystallization gels, it has been possible to obtain the various known types of mazzite called omega, ZSM-4, LZ 202 or MZ-34 (cf W. M. Meier and D. H. Olson, "Atlas of Zeolite Structure Types", Third Revised Edition, Butterworth, London 1992).

However, whatever the method of synthesis employed above, it has been impossible to synthesize a mazzite exhibiting an Si/Al ratio in the precursors or alternatively crude synthetic products greater than 5, these ratios generally being between 2.5 and 5, which corresponds to a molar aluminium concentration varying between 0.166 and 0.285. Now, the combination of a high aluminium content and of a unidirectional porosity does not favour the application of such an unactivated mazzite in catalysis, because the desired optimum Si/Al ratio is frequently greater than 10 for such an application, which can only be obtained by dealumination during an activation phase.

Activation phase is usually understood to mean the combined individual stages carried out after the synthesis of a zeolite and which are targeted at rendering it active in catalysis and in adsorption. These individual stages, generally preceded by a stage of calcination of the crude synthetic zeolite precursor, comprise an ion exchange, then a hydrothermal treatment and an acidic washing.

These treatments are known to induce profound textural and structural modifications in zeolites, and mazzites in particular, which affect their porosity and their acidity. Thus, the calcination stage, intended to decompose the organic structuring agent occluded within the pores of the mazzite precursor, causes partial degradation of the structure and the formation of amorphous residues which remain trapped in the pores and which obstruct the channels of the mazzite. The lower the Si/Al ratio in the precursor, the greater the loss in crystallinity and the greater the amount of amorphous residues. This limits the catalytic efficiency of the mazzite and the effectiveness of the subsequent activation treatments. In addition, the hydrothermal treatment and acidic washing stages result in the formation of non-bridging bonds, creating silanol defects which decrease the strength and the number of acid centres, reducing the long-distance order in the zeolite lattice.

The aim of the present invention is to avoid the problems encountered by mazzites with an excessively low Si/Al ratio, which, after activation, contain amorphous residues and lattice defects which reduce the catalytic performances, and the present invention is targeted at the production of a silica-enriched activated mazzite with improved properties and with a limited number of silanol defects in the lattice which exhibits a larger number of available acid sites and in particular an increased acid strength.

The subject of the present invention is a silica-enriched activated mazzite with a chemical formula, in the anhydrous state, expressed as molar ratio, of $$aM_{2/n}O.Al_2O_3.bSiO_2$$

with a varying from 0 to 0.5, M denoting an alkaline cation of valency n and b being greater than 7, characterized in that it exhibits an acid strength, expressed as amount of heat of adsorption of ammonia, greater than 190 kJ/mol and a pore volume, measured by adsorption of cyclohexane, greater than 0.09 ml/g.

According to the present invention, the acid strength of the activated mazzite corresponds to the amount of initial heat of adsorption of ammonia; it is measured by microcalorimetry. The measurement consists in adsorbing gaseous ammonia on the activated mazzite at 150° C. and in measuring the amount of heat released. The activated mazzite according to the invention exhibits a particularly significant acid strength because, until now, whatever the method of synthesis known and employed by a person skilled in the art, it has never been possible to obtain as high a value of the amount of heat of adsorption of ammonia on an activated mazzite.

These measurements of acidity of the mazzite from the amounts of heat of absorption of ammonia are fully described in the article entitled "A multitechnique characterization of the acidity of dealuminated mazzite" by D. McQueen, B. H. Chiche, F. Fajula, A. Auroux, C. Guimon, F. Fitoussi and Ph. Schulz, J. Catal., 1996, 161.

In order to obtain such an acid strength, the activated mazzite according to the invention is obtained from a zeolite precursor itself synthesized from a crystallization gel containing faujasite X, with an Si/Al ratio of less than 1.5, the said precursor subsequently being subjected to an activation treatment.

The Applicant Company had already synthesized mazzite from grains of faujasite Y with an Si/Al ratio of greater than 1.5, as is described in Patent FR 2,698,862. However, in contrast to what it had recommended, the molar composition of the crystallization gel is completely different; in fact, the molar ratios vary from 5 to 15 for $SiO_2/Al_2O_3$ from 1 to 2 for $SiO_2/TMA_2O$ from 0.03 to 0.25 for $TMA_2O/Na_2O$ and from 30 to 150 for $H_2O/Na_2O$ with $TMA_2O$, the organic structuring agent, chosen from tetraalkylammonium ions, each alkyl group comprising from 1 to 4 carbons and preferably denoting the tetramethylammonium ion. The sodium is introduced partly by the addition of sodium hydroxide used to adjust the alkalinity of the gel and the tetravalent silicon and trivalent aluminium sources originate partly from the group composed of silicates, solid or colloidal silicas, gels and xerogels, hydrolyzable silicic esters and diatomites and, on the other hand, from faujasite X. In the gel, it is possible, however, to have therein a mixture of alkaline ions, it being possible for the latter in particular to be introduced by faujasite X.

The use of commercially available faujasite X has made it possible to reduce both the cost of the starting materials and the cost of manufacture of the zeolite of mazzite type. This is because it is no longer necessary to form grains with a specific configuration which are delimited solely by rounded surfaces, the synthesis of which is expensive, in particular in time (10 to 12 days of crystallization at 50° C., with or without stirring), as was described in Patent FR 2,698,862.

DESCRIPTION OF THE PREFERRED EMBODIMENTS

In the process according to the invention, it is possible for the activation treatment, comprising at least two stages, a first ion exchange stage and a second dealumination stage, to be carried out either on the crude synthetic zeolite precursor after crystallization or on the precursor which has been subjected to the conventional calcination heat treatment in order to remove the organic structuring agent. This stage of calcination of the crude synthetic precursor consists in heating under a flow of nitrogen or of air or of a mixture of both for 5 minutes to 10 hours, preferably 5 hours, at a temperature greater than 450° C., preferably between 500 and 550° C. However, in a preferred form of the invention, the activation treatment is applied to the crude synthetic precursor.

By dispensing with the calcination stage accepted until now as necessary in order to remove the organic structuring agent, it has been possible to obtain mazzites with crystalline lattices exhibiting fewer structural defects (detectable by $^{27}Al$ NMR, infrared, and the like or other methods known to a person skilled in the art), indeed no structural defects.

In a preferred form of the invention, the ion exchange stage consists in exchanging the alkaline ions of the crude synthetic zeolite precursor containing the organic structuring agent by washing by means of an aqueous solution of an ammonium salt and/or of an inorganic or organic acid with a pH of less than or equal to 3.

During the dealumination stage, the solid recovered after ion exchange is maintained at a temperature of between 450 and 850° C. under a moist atmosphere for a period of time of 1 minute to 4 hours and then washed by means of an acidic buffer solution with a pH varying from 1 to 5, at a temperature varying from 20 to 100° C. The solid thus heat-treated is washed during the second dealumination phase with a buffer solution composed of a mixture of at least one ammonium salt and of at least one inorganic or organic acid with a pH preferably of between 2 and 3. In a preferred form, the buffer solution will contain inorganic ammonium salts and their corresponding acids.

A second embodiment of the invention is the process for producing activated mazzite comprising a stage of preparation of the mazzite precursor and a stage of activation of this said mazzite precursor. It is distinguished from the other known processes for obtaining activated mazzite in that, in order to prepare the precursor, a faujasite X is introduced into the composition of the crystallization gel, that the activation treatment is applied to the precursor containing the organic structuring agent and that the acidic dealumination washing is carried out by means of a buffer solution of an acid salt and of an inorganic or organic acid with a pH of less than 3, preferably of between 2 and 3.

In addition, the said process according to the invention is also characterized by a molar composition of silica, alumina, alkaline ions and organic structuring agent in the crystallization gel such that the molar ratios vary from 5 to 15 for $SiO_2/Al_2O_3$ from 1 to 2 for $SiO_2/TMA_2O$ from 0.03 to 0.25 for $TMA_2O/Na_2O$ and from 30 to 150 for $H_2O/Na_2O$ with $TMA_2O$, the organic structuring agent, chosen from tetraalkylammonium ions, each alkyl group comprising from 1 to 4 carbons, preferably tetramethylammonium ions, and the tetravalent silicon and trivalent aluminium sources originating partly from the group composed of silicates, solid or colloidal silicas, gels and xerogels, hydrolysable silicic esters and diatomites and, on the other hand, from faujasite X.

Compared with the conventional processes, the process according to the invention exhibits a treatment which is simplified in time and in treatment cost by the use of readily available commercial zeolites and by the elimination of calcination stages which generate defects in the activated mazzite.

Such activated mazzites according to the invention are particularly efficient in the conversion of hydrocarbons, in particular the isomerization of $C_4$ to $C_8$ paraffins and in any conversion of hydrocarbons which involves a bifunctional or acid catalysis mechanism, in particular as molecular sieves in processes for the separation of hydrocarbons.

The examples given hereinbelow are targeted at clarifying the invention but may not, under any circumstances, limit the scope thereof.

EXAMPLE I

The present example is targeted at showing the superiority of the mazzite according to the invention compared with the activated mazzites according to the prior art as regards the acid strength.

Four samples of activated mazzite were prepared:

The activated mazzite characteristic of the invention, known as MAZ-$X_0$ the activated mazzite according to Patent FR 2,698,862, known as MAZ-$Y_1$ the activated mazzite obtained according to Patent FR 2,651,221, known as MAZ-G the activated mazzite obtained according to the procedure of U.S. Pat. No. 5,139,761, known as MAZ-T The conditions for the preparation of these various zeolites are given in Table I hereinbelow.

In order to form the crystallization or synthesis gel for the MAZ-$X_0$, MAZ-$Y_1$ and MAZ-G, the sodium hydroxide and then the tetramethylammonium chloride (TMACl) are dissolved in deionized water, the solution being stirred mechanically at approximately 150 revolutions per minute, and then the silica source is added gradually while continuing to stir over 1 hour. Finally, the aluminium source is added, still while stirring the solution and while maintaining it for a further two hours, this latter stirring phase corresponding to the maturing of the gel. The gel, thus matured, is transferred to a reactor where it is kept stirring under autogenous pressure for 24 hours at 115° C. to enable the mazzite crystals to grow. The solid collected or zeolite precursor is dried for 12 hours in an oven at 115° C. After drying, the crystals are calcined under air at 550° C. for 4 hours. For the mazzite according to the invention, this calcination stage has been eliminated. To prepare the MAZ-T, the procedure described in Examples 1 and 2 of U.S. Pat. No. 5,139,761 has been followed.

TABLE I

|  | MAZ-$X_0$ | MAZ-$Y_1$ | MAZ-G | MAZ-T |
|---|---|---|---|---|
| Composition of the gel (in g) | | | | |
| $H_2O$ | 9511.6 | 1004.8 | 50 | 15,604 |
| NaOH | 752.8 | 66.1 | 2.62 | 6804 |
| KOH | 0 | 0 | 1.92 | 0 |
| TMACl | 130.8 | 148.2 | 0.97 | 2690 (TMABr) |
| $SiO_2$ source | 1663.6 (Zeosil Z175) | 149.6 (Cecagel, Ceca) | 8.10 (Cegagel, Ceca) | 57780 (Sodium silicate: 21.9% $SiO_2$) |
| $Al_2O_3$ source | 654 (Siliporite Na) | 87 (Specific Faujasite Y) | 1.85 (Specific Faujasite Y) | 42770 Alum (8.3% $Al_2O_3$ + 24.1% $H_2SO_4$ + 67.6% $H_2O$) |
| Crystallization conditions | | | | |
| T° C. | 115° C. | 115° C. | 115° C. | 125° C. |
| Pressure | Autogenous | Autogenous | Autogenous | Autogenous |
| Time | 45 h | 45 h | 24 h | 45 h |
| Drying (Time h) | 110° C. (12 h) | 110° C. (12 h) | 110° C. (12 h) | 100° C. |
| Calcination | No | 550° C. (4 h) under air | 550° C. (4 h) under air | 540° C. (1.5 h) |

In all cases, the mazzite precursor is prepared under the conditions laid down in Table I according to the order described hereinbelow.

The specific conditions of the activation treatment for each of the mazzites sampled is given in Table II hereinbelow.

TABLE II

|  | MAZ-$X_0$ | MAZ-$Y_1$ | MAZ-G | MAZ-T |
|---|---|---|---|---|
| Ion exchange | | | | |
| Solution (Concentration) | $(NH_4)_2SO_4$ (0.5 M) | $NH_4NO_3$ (0.5 M) | $NH_4NO_3$ (0.5 M) | $NH_4NO_3$ (0.5 M) |
| T° C. | 80° C. | 80° C. | 80° C. | 93° C. |
| Time | 1 h | 1 h | 1 h | 1 h |
| Washing | yes | yes | yes | yes |
| Drying | | | | |
| Dealumination | | | | |
| Heat treatment 100% $H_2O$ | | | | |
| T° C. (Time in h) | 620° C. (2 h) | 620° C. (2 h) | 620° C. (2 h) | 550° C. (2 h) |
| Acidic washing | Buffer $(NH_4)_2SO_4$ (0.5 M) + $HNO_3$ (1 N) | $HNO_3$ (1.5 N) | $HNO_3$ (1.5 N) | $NH_4NO_3$ + $HNO_3$ |

TABLE II-continued

|  | MAZ-$X_0$ | MAZ-$Y_1$ | MAZ-G | MAZ-T |
|---|---|---|---|---|
| T° C. | reflux | reflux | reflux | 93° C. |
| Crystallinity | 95% | 90% | 80% | 85% |

This activation treatment comprises a first ion exchange stage and a second dealumination stage comprising two phases, the first of treatment with steam and the second of acidic washing.

The stage of ion exchange of the sodium ions is carried out by washing the calcined or non-calcined (invention) zeolite precursor with an ammonium salt solution with compositions described in Table II at a temperature of less than 100° C. The treatment with steam consists in leaving the zeolite in an atmosphere of steam at a temperature of greater than 500° C. for at least 2 hours. The acidic washing stage consists in washing the solids obtained with an acidic solution with a pH and composition given in Table II for at least half an hour, such that the ratio of the volume of solution to the weight of zeolite treated is less than or equal to 10 ml/g.

The crystallinities of the activated mazzites, measured by X-ray diffraction, are given in Table II and their respective acid strengths, expressed in kilojoules per mol, are given in Table III.

The acid strength of each of these activated mazzites is measured by using the ammonia adsorption microcalorimetry technique described by A. Auroux in "Catalyst, Characterization, Fundamental and Applied Catalysis. Physical Techniques for Solid Materials", edited by B. Imelik and J. C. Vedrine, Plenum Press, New York, 1994, which makes it possible to study the acid strength of the sites present, the strongest acid sites being measured by measuring the initial heat of desorption of $NH_3$.

TABLE III

|  | MAZ-$X_0$ | MAZ-$Y_1$ | MAZ-G | MAZ-T |
|---|---|---|---|---|
| Q ads (kJ/mol) | 205 | 190 | 165 | 170 |
| Acidity in meq $H^+$/g | 0.385 | 0.250 | 0.190 | 0.205 |

It is found that the acid strength and the number of acid sites are much greater for the activated mazzite according to the invention.

EXAMPLE II

The present example is targeted at showing the specificity of the process for producing activated mazzite according to the invention from faujasite X, compared with the process for the preparation of activated mazzite obtained from faujasite Y.

Several samples were tested:

the first is the activated mazzite MAZ-$X_0$, in accordance with the invention, prepared as described in Example I, the second is the activated mazzite obtained from faujasite Y (especially synthesized as in U.S. Pat. No. 2,698,862) under the conditions of the present invention, hereinafter known as (MAZ-$Y_0$)$_a$, the third is an activated mazzite obtained like (MAZ-$Y_0$)$_a$ but obtained from a commercial faujasite Y, hereinafter known as (MAZ-$Y_0$)$_b$, the fourth is an activated mazzite obtained from faujasite X under the conditions of Patent FR 2,698,862, hereinafter known as MAZ-$X_1$, the fifth is the activated mazzite MAZ-$Y_1$ in accordance with the invention of Patent FR 2,698,862 and prepared as described in Example I.

The characteristics of the crystallization gels and of the crystallinity obtained for each sample after the first stage of synthesis and after activation are collated in Table IV hereinbelow.

TABLE IV

|  | MAZ-$X_0$ | (MAZ-$Y_0$)$_a$ | (MAZ-$Y_0$)$_b$ | MAZ-$X_1$ | MAZ-$Y_1$ |
|---|---|---|---|---|---|
| Crystallization gel (g) | | | | | |
| $H_2O$ | 9511.6 | 9510 | 9510 | 1004 | 1004.9 |
| NaOH | 752.8 | 753 | 753 | 67 | 67 |
| TMACl | 130.8 | 130 | 130 | 149 | 149 |
| $SiO_2$ source | 1669.6 (a) | 1664 (a) | 1663 (a) | 150 (b) | 149.6 (b) |
| $Al_2O_3$ source | 654.4 (c) | 655 (d) | 656 (e) | 88 (c) | 87.6 (d) |
| Morphology of the crystals and crystallinity | Hexagonal prisms of 2 × 1 μm approximately 100% | amorphous % MAZ < 25% | amorphous % MAZ < 25 | Essentially amorphous product | Hexagonal prisms of 2.5 × 1.5 μm 100% |

(a)=Zeosil Z145, sold by Rhône-Poulenc.
(b)=Cecagel, sold by Ceca
(c)=Siliporite NaX, sold by Ceca
(d)=NaY, obtained according to the synthetic process described in FR 2,698,862
(e)=NaY, sold by Zeocat (ZF 110 with a ratio Si/Al=2.7).

It is found that the preparation of mazzite "Y" from faujasite Y according to the present invention is impossible, whatever the size or the shape of the crystals of the said faujasite Y. Likewise, mazzite "X" cannot be prepared from faujasite X according to the procedure of Patent FR 2,698, 682. The two routes for producing mazzite via the faujasites X and Y are entirely distinct.

EXAMPLE III

The present example describes the use of the activated mazzite according to the invention in the composition of catalysts for the isomerization of paraffins (in this instance, n-hexane), compared with the use of other activated mazzites of the prior art in these catalysts.

In order to prepare these isomerization catalysts, each sample of activated mazzite is kneaded with alumina and water in order to form a pasty mixture containing 20% by weight of alumina. The mixture is extruded through a die; the dried and calcined extrudates exhibit a diameter of 1.6 mm and a length varying from 3 to 5 mm.

0.3% by weight of platinum is deposited on these extrudates, constituting the support of the catalyst, by cation exchange of the support with the salt $Pt(NH_3)_4Cl_2 \cdot H_2O$ in the presence of competitor ions, for example ammonium nitrate.

The catalyst is subsequently calcined under air at 520° C. and then the metal is reduced under hydrogen flow, the temperature being gradually raised from 150 to 450° C. At the end of the treatment, the metal phases are completely divided and distributed within the solid.

The comparative tests of activity of the catalysts thus formed from mazzites are carried out in a stationary-bed catalytic unit with the operating conditions hereinbelow:

temperature of the reactor between 150 and 300° C., pressure of 1 atmosphere, a hydrogen/n-hexane molar ratio equal to 70, an HVR (space velocity), expressed by the ratio of the masses of charge and of catalyst, equal to $0.2\ h^{-1}$.

The performances of these catalysts are defined from the following characteristics:

$T_{50\%}$=temperature necessary in order to obtain a conversion of the n-hexane of 50%.

Conversion is understood to mean the percentage of product isomerized with respect to the amount of the same product present in the charge.

$Y_i$=yield of dibranched isomers at 50% conversion of the n-hexane, with i=23DMB corresponding to the 2,3-dimethylbutane isomer and i=22DMB corresponding to the 2,2-dimethylbutane isomer. This yield corresponds to 100 times the ratio of the mass of isomer under consideration to the total mass of the hydrocarbons after isomerization.

$T_{crack}$=temperature of appearance of the cracking products in °C.

Conv.=optimum conversion in % which can be achieved with a catalyst under consideration.

$T_{conv.}$=temperature at which the optimum conversion is achieved in °C.

The results are collated in Table V hereinbelow.

TABLE V

| Catalyst based on: | $T_{50\%}$ (° C.) | $Y_{22DMB}$ (%) | $Y_{23DMB}$ (%) | $T_{crack}$ (° C.) | Conv. (%) | $T_{conv.}$ (° C.) |
|---|---|---|---|---|---|---|
| MAZ-$X_0$ | 182 | 5.8 | 8.1 | 226 | 90 | 232 |
| MAZ-$Y_1$ | 190 | 5.2 | 8.0 | 232 | 85 | 245 |
| MAZ-G | 200 | 4.9 | 7.3 | 231 | 86 | 255 |
| MAZ-T | 205 | 4.6 | 7.4 | 237 | 82 | 260 |

It is found, from this table, that the catalyst prepared from MAZ-$X_0$ in accordance with the invention is more active (lower $T_{50\%}$ and $T_{conv.}$ working temperatures to obtain a greater degree of conversion) and more selective for dibranched isomers than the other catalysts of the prior art.

We claim:

1. Silica-enriched activated mazzite with a chemical formula, in the anhydrous state, expressed as molar ratios, of $$aM_{2/n}O \cdot Al_2O_3 \cdot bSiO_2$$

with a varying from 0 to 0.5, M being an alkaline cation of valency n and b being greater than 7, which exhibits an acid strength, corresponding to the amount of heat measured by ammonia adsorption microcalorimetry, greater than 190 kJ/mol and a pore volume, measured by adsorption of cyclohexane, greater than 0.09 ml/g.

2. Activated mazzite according to claim 1, which is obtained from a zeolite precursor itself synthesized from a crystallization gel containing faujasite X, the said precursor being subjected to an activation treatment.

3. Activated mazzite according to claim 2, wherein the crystallization gel exhibits a molar composition of silica, alumina, alkaline ions and organic structuring agent such that the molar ratios vary from 5 to 15 for $SiO_2/Al_2O_3$ from 1 to 2 for $SiO_2/TMA_2O$ from 0.03 to 0.25 for $TMA_2O/Na_2O$ and from 30 to 150 for $H_2O/Na_2O$ with $TMA_2O$, the organic structuring agent, chosen from tetraalkylammonium ions, each alkyl group comprising from 1 to 4 carbons, and the tetravalent silicon and trivalent aluminium sources originating partly from the group composed of silicates, solid or colloidal silicas, gels and xerogels, hydrolysable silicic esters and diatomites and, optionally, from faujasite X.

4. Activated mazzite according to claim 2, wherein the zeolite precursor, with or without organic structuring agent, is activated in at least two stages, a first ion exchange stage and a second dealumination stage.

5. Activated mazzite according to claim 4, wherein, during the ion exchange stage, the alkaline ions of the zeolite precursor containing the organic structuring agent are exchanged by washing by means of an aqueous solution of an ammonium salt and/or of an inorganic or organic acid with a pH of less than or equal to 3.

6. Activated mazzite according to claim 4, wherein, during the first phase of the dealumination stage, the solid obtained after ion exchange is maintained at a temperature of between 450 and 850° C. under a moist atmosphere for from 1 minute to 4 hours and then washed by means of an acidic buffer solution with a pH varying from 1 to 5, at a temperature varying from 20 to 100° C.

7. Activated mazzite according to claim 4, wherein, during the second dealumination phase, the heat-treated solid is washed with a buffer solution composed of a mixture of at least one inorganic or organic acid with at least one ammonium salt of at least one inorganic or organic acid with a pH of between 2 and 3.

8. Activated mazzite according to claim 7, wherein the buffer solution is a mixture of an ammonium salt and of the acid corresponding to this said salt.

9. Process for producing the activated mazzite according to claim 1 comprising a stage of preparation of the zeolite precursor and a stage of activation of the said zeolite precursor, wherein the crystallization gel contains a faujasite X, that the activation treatment is applied to the zeolite precursor containing the organic structuring agent and that an acidic dealumination washing is carried out by means of a buffer solution of an acid salt and of an inorganic or organic acid with a pH of less than 3.

10. Process according to claim 9, wherein the crystallization gel exhibits a molar composition of silica, alumina, alkaline ions and organic structuring agent such that the molar ratios vary from 5 to 15 for $SiO_2/Al_2O_3$ from 1 to 2 for $SiO_2/TMA_2O$ from 0.03 to 0.25 for $TMA_2O/Na_2O$ and from 30 to 150 for $H_2O$/alkaline ion with $TMA_2O$, the organic structuring agent, chosen from tetraalkylammonium ions, each alkyl group comprising from 1 to 4 carbons, and the tetravalent silicon and trivalent aluminium sources originating partly from the group composed of silicates, solid or colloidal silicas, gels and xerogels, hydrolysable silicic esters and diatomites and, optionally, from faujasite X.

11. The activated mazzite according to claim 3, wherein the tetralkylammonium ions are tetramethylammonium ions.

12. The process according to claim 10 wherein the tetralkylammonium ions are tetramethylammonium ions.

13. In a process for the isomerization of $C_4$ to $C_8$ parafinic hydrocarbons, the improvement which comprises conducting the isomerization in the presence of the activated mazzite of claim 1.

14. In a process for the conversion of hydrocarbons which involves a bifunctional or acid catalytic mechanism, the improvement which comprises conducting the conversion in the presence of the activated mazzite of claim 1.

* * * * *